March 17, 1970 N. R. DAVIE 3,501,754

COMPUTER MEMORY STROBING CIRCUIT FOR PROVIDING AN ACCURATELY POSITIONED STROBE PULSE

Filed May 21, 1968 3 Sheets-Sheet 1

INVENTOR.
NEIL R. DAVIE

BY Frank R. [signature]

AGENT

March 17, 1970 N. R. DAVIE 3,501,754

COMPUTER MEMORY STROBING CIRCUIT FOR PROVIDING AN ACCURATELY POSITIONED STROBE PULSE

Filed May 21, 1968 3 Sheets-Sheet 2

INVENTOR.
NEIL R. DAVIE

BY [signature]

AGENT

March 17, 1970 N. R. DAVIE 3,501,754

COMPUTER MEMORY STROBING CIRCUIT FOR PROVIDING AN ACCURATELY POSITIONED STROBE PULSE

Filed May 21, 1968 3 Sheets-Sheet 3

INVENTOR.
NEIL R. DAVIE

BY Frank R. [signature]

AGENT

United States Patent Office 3,501,754
Patented Mar. 17, 1970

3,501,754

COMPUTER MEMORY STROBING CIRCUIT FOR PROVIDING AN ACCURATELY POSITIONED STROBE PULSE

Neil R. Davie, Littleton, Colo., assignor to Ferroxcube Corporation, Saugerties, N.Y., a corporation of Delaware Filed May 21, 1968, Ser. No. 730,787
Int. Cl. G11c *7/00;* H03k *17/74*
U.S. Cl. 340—174 4 Claims

ABSTRACT OF THE DISCLOSURE

An arrangement for providing an accurately positioned strobe pulse which will consistently strobe the peak point of the output current of a selected core within a core memory matrix regardless of drive circuit delay variations and variable core peaking delays is provided with a diode clamp coupled to the last to be selected row or column coordinate drive line. Strobing delay initiating circuitry is coupled to the clamped line. When drive current selection switches are coupled to the selected drive line, the conducting diode will maintain the voltage across the line constant until the selected line current has risen to approximately drive current. The diode clamp is positioned such that at this point conduction ceases and strobe initiation begins.

This invention relates to information storage systems and more particularly to strobe selection in a magnetic storage matrix arrangement.

Modern magnetic storage matrices commonly employ arrays of magnetic storage elements, commonly magnetic cores, arranged in pluralities of rows and columns. The most common form of storage arrangement using magnetic storage elements is a coincidence drive system. In such an arrangement, the storage elements are arranged in a plurality of rows and columns in a single plane, stacks of planes being assembled to form a matrix stack.

Each of the magnetic storage elements possess a square loop hysteresis characteristic and are switchable from one remanent state to the other by applying to the element a magnetic field of sufficient strength and polarity. These fields are generated by means of current passed through wires which are inductively coupled to each of the elements. Commonly, each element is coupled to two or more drive wires, each of which carry a portion of the current necessary to switch the element from one remanent state to the other. Since each element in a plane is uniquely addressable by the row and column drive wire pulse, a coincidence of partial selecting currents coupled to a single magnetic element will in concert be sufficient to switch the element common to both row and column drive wires from one remanent state to the other. An output winding is coupled to all the cores within a selected plane and, upon the switching of a remanent state of a magnetic storage element, will have induced therein a voltage corresponding to the flux variation produced by the remanent change.

Remanent change however is not instantaneous. The voltage induced in the output winding as a result of a change in remanent state will exhibit a characteristic rise from the moment of application of a coincidence switching pulse to a peak value and then taper off to a zero value. If the remanent condition of the magnetic storage element initially is such that application of full switching current acts to reinforce rather than reverse the remanent condition, a partial output pulse is obtained from the storage element which exhibits a relatively steeper rise time characteristic and a significantly earlier drop off.

In order to distinguish between the outputs resulting from these initial remanent conditions, it is common to provide some means for strobing the output waveform of the matrix plane and a selected operation. Ideally, the strobe point should occur at a sufficient time after the beginning of the switching operation so as not to provide an output as a result of reinforcement of remanent condition, and yet should not be applied so late during output as to not provide a sufficient indication of a reversal of remanent condition.

Conventional strobing circuits commonly operate from a timing control chain which provides pulses at fixed spaced intervals for controlling the operating of the memory system. An early pulse, after initiation of the timing chain, will for example initiate a row current drive line, and a subsequent pulse will initiate the column current drive line. A further pulse is then provided for initiating a strobe operation. Since it is the last applied drive current which, in coincidence with the earlier applied drive current, initiates the coincidence switching operation of a storage element, the delay between the last to be applied current drive and the strobe pulse is designated so as to select the peak output point of the selected storage element. Alternatively, the strobe pulse generator may operate directly from the line current drivers with a predetermined fixed delay beginning with the initiation of the drive current rise.

The difficulty encountered with the foregoing arrangement lies with the inflexibility of having a fixed delay. Variations in the strobe timing of magnetic memory output signals can occur, as in the use of the timing chain, due to cumulative delay factors in driving and gating circuitry. Furthermore, with regard to both of the above-noted conventional methods, since a selected row of storage elements will have an inductance depending upon the number of switched cores present on the line, as well as the length and termination of the line, timing variation can result from variations in output peaking delays due to drive current rise time variations. Also, the need of a large delay strobe circuit creates wider tolerance variations resulting from the relatively large delay setting necessary to insure that the strobable area will coincide with the peaking time and measure from the beginning of the drive current rise.

It is therefore a primary object of the present invention to provide an arrangement which will substantially eliminate variations in strobe timing of magnetic memory output signals.

It is a further object of this invention to provide an arrangement for insuring that the strobable area of the magnetic memory output signal will substantially coincide with the peak area of the magnetic storage element output.

It is a still further object of this invention to provide a delayed strobing circuit with a substantially smaller fixed delay time than heretofor provided in conventional strobing circuits.

In accordance with the foregoing objects, the present invention makes use of the fact that in magnetic storage elements, for example magnetic cores, signal peaking will occur at an approximately constant delay time after the drive current applied to the core reaches the full select current of the core. The invention is a circuit arrangement which will provide a strobe pulse at the output of the memory plane containing the selected magnetic core storage element after a fixed delay from the time drive current rise substantially equals full select current. To accomplish the foregoing, a diode clamp is connected between the junction of a strobe initiation circuit and a current source supply line which couples current to the last to be selected row or column coordinate, and a fixed reference point. The relative levels of the source and reference render the diode clamp conductive and the diode clamp serves as a current sink, thus providing a low impedance path for current flowing from the line current source and preventing current from the source from reaching the strobe initiation circuit. Selection of a storage drive line by appropriate selecting circuitry will cause current to begin to flow through the selected storage drive line. The strobe initiation circuit is coupled between a strobing circuit having a predetermined delay of a magnitude substantially in accordance with the core characteristic and the current source line. Thus, as long as the current flowing in the current source line is below full select current the diode clamp remains conducting and strobe initiation is blocked. When the current in the current source line reaches the full select current, the diode becomes reverse-biased and the strobe initiation line receives a strobe initiation pulse. The strobe circuit delay, designed to approximate the delay between the moment drive current reaches full select current and core peaking, will provide a strobing pulse at the output of the memory in approximate coincidence with the peak core output signal.

The various objects, features, advantages and operation of the present invention may be more clearly understood when read in connection with the following description and appended claims, and with the accompanying drawings, in which:

Figure 2:
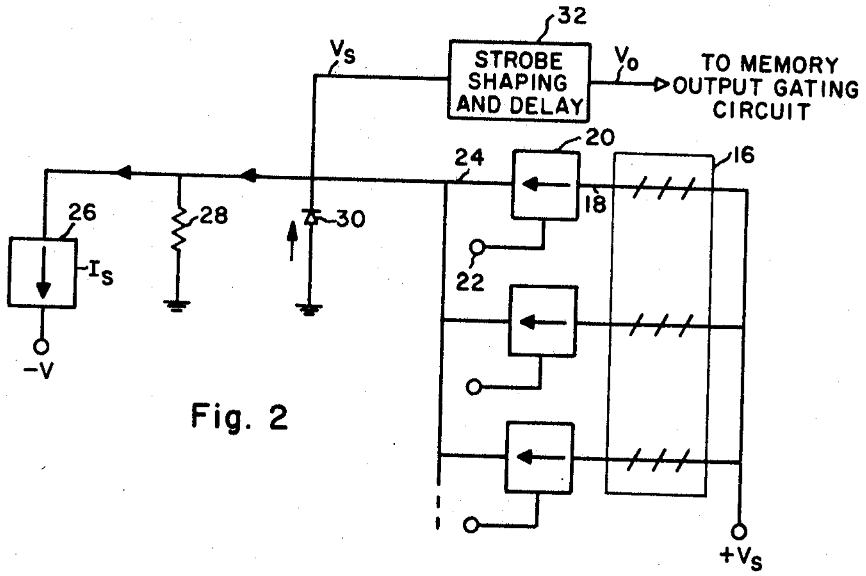
FIG. 2 is a functional diagram illustrating the essence of the present invention.
Figure 3A:
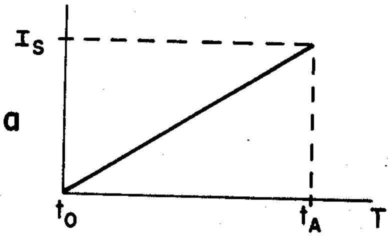
Figure 3C:
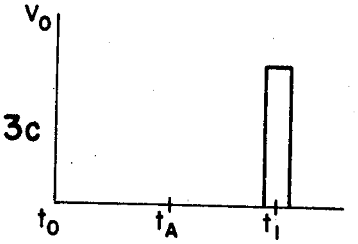
Figure 3B:
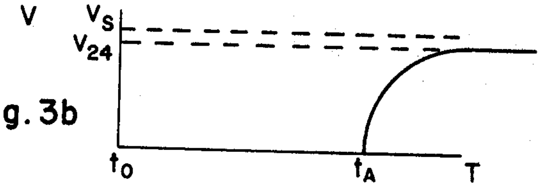
Figure 4:
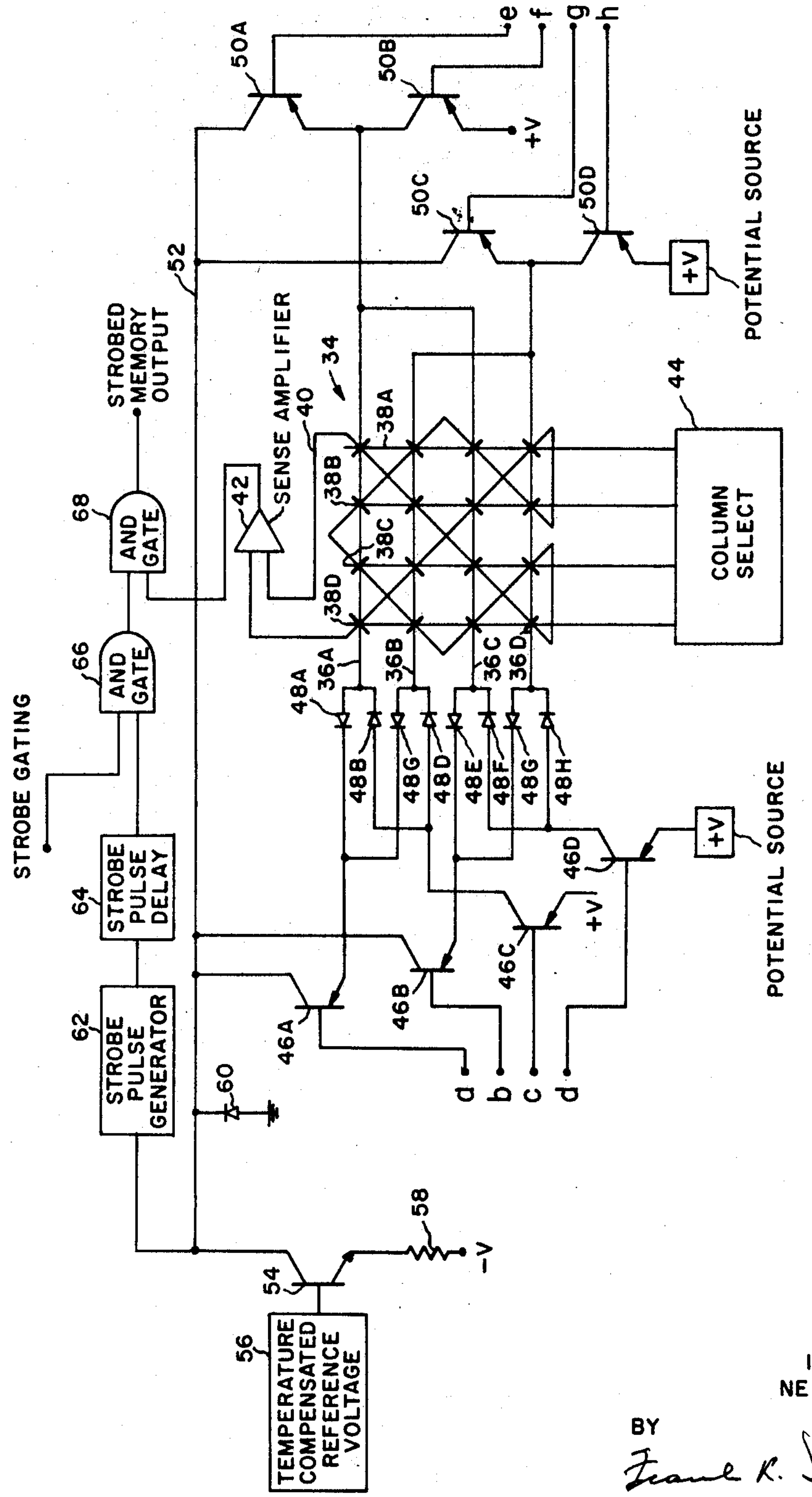
Figure 5:
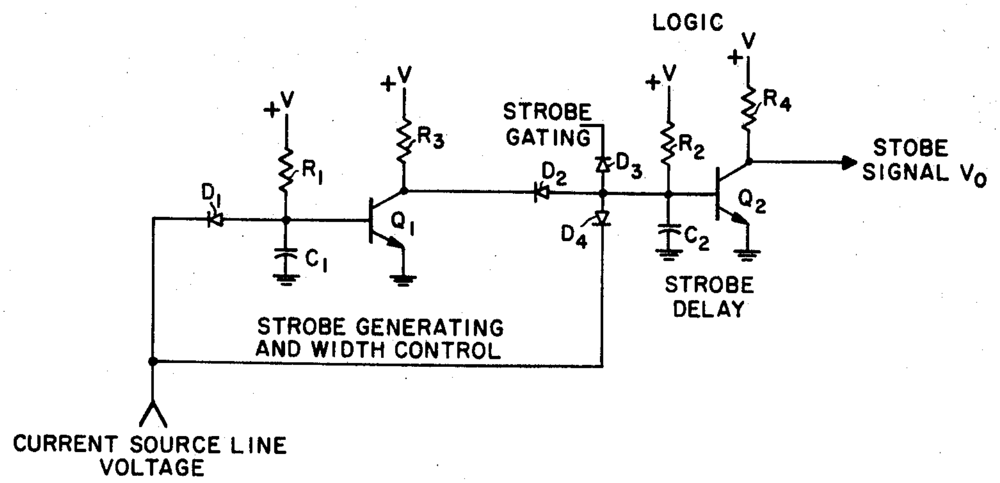
Figure 6:
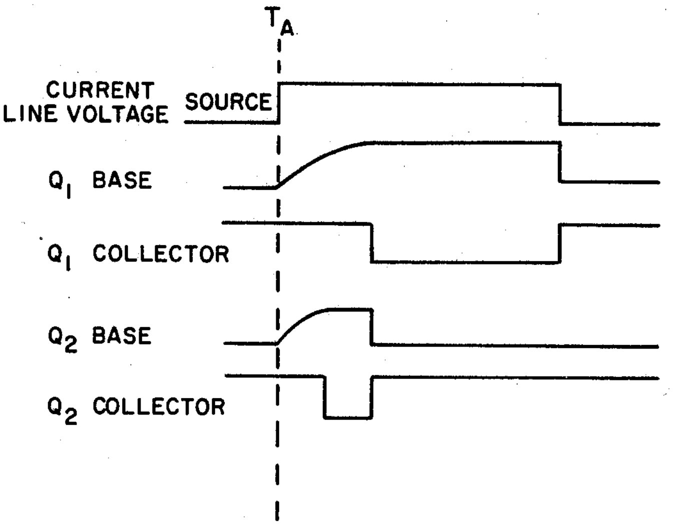

FIGS. 3*a*, 3*b*, and 3*c* illustrate current and voltage waveforms respectively for FIG. 2;

FIG. 4 is a schematic showing the use of the invention with a magnetic core storage selection system;

FIG. 5 illustrates a strobe generating, shaping and delay circuit usable in accordance with the present invention; and FIG. 6 shows the waveform relationships of FIG. 5.

The selection of magnetic storage elements by means of application thereto of a magnetic field of sufficient strength to switch the storage element from one remanent state to the other is commonly effected by means of a winding coupled to the storage element and having induced thereon a voltage representative of the change in the remanent condition of the storage element as a result of selection. One of the most common forms of storage elements are magnetic cores, composed of a ferrite material in a homogeneous polycrystalline form, toroidal in shape, and having a substantially rectangular hysteresis loop characteristic. This variety of magnetic storage element will be used herein for purpose of discussion.

Figure 1:
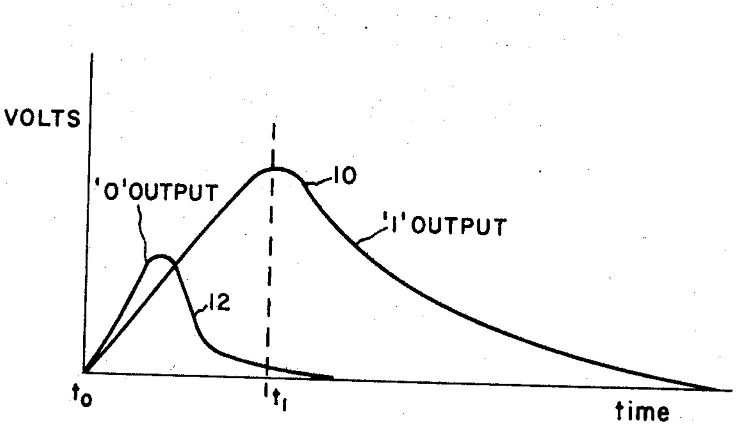
FIG. 1 illustrates the output waveform of a selected magnetic storage element.

Referring to FIG. 1, typical output characteristic curves are illustrated for a magnetic storage plane composed of an array of cores in rows and columns. When a reversal of core remanent condition is indicated, for example as representative of a binary "1," the output voltage induced by the flux change on an output conductor coupled to the core will, as indicated by curve 10, rise from its initial point to until it reaches a peak value at $t_1$ and then taper off to approximately a zero voltage value. A remanent reinforcement output condition representative, for example, of a binary "0" as illustrated by curve 12, will rise more steeply from time $t_0$ reaching a peak lesser in magnitude than the peak of the output curve 10, and more rapidly decaying until reaching approximately zero level. As is evident from FIG. 1, a meaningful strobe must provide a positive indication as the output 10 and a zero indication of the output 12. Thus, the optimum strobable area would be in a narrow range surrounding time $t_1$. This would take advanage of the peak effect of the output curve 10 while disregarding, to the extent possible, the output condition of curve 12. Thus, the system will be able to accurately distinguish between 1's and 0's.

The delay from $t_1$ to $t_0$, representing the time for the core to reach its optimum peak output value from the moment it begins to reverse its remanent field condition, is fairly constant and can be anticipated. In prior art systems, where strobe pulses were provided after fixed delays from a timing chain or at a fixed delay from the beginning of the last to be applied drive pulse, the varying inductive coupling on the various drive lines necessitated fixing a compromise value for the delay figure. In order to insure strobing peak area of the "1" output condition, strobe pulses provided output signals which were object to varying degrees of trouble-some signal to noise ratio, depending on the particular delay fixed for strobing.

Referring now to FIG. 2, there is illustrated a simplified diagram illustrating the use of the present invention in connection with a memory system. A memory plane 16 is provided with a plurality of magnetic cores arranged in rows and columns, each row being commonly connected to a row drive line 18 and commonly terminated in a voltage source of +V. Sense, inhibit and column conductors are omitted for the sake of clarity. Each row conductor is driven by a row current drive 20, having coupled thereto a selection input 22 and a current supply line 24. The current supply line is provided with a current source 26 which in turn is coupled to a voltage source of —V. A resistance 28 connects the current supply line 24 to a common reference point, illustrated as ground, and a diode 30 is connected between current supply line 24 and ground. A stroke shaping and delay circuit 32 is connected between the current supply line and output gating circuitry for the memory plane 16.

In operation, prior to selection of a memory plane row, current source 26, drawing current in a direction indicated by the arrow, will forward-bias the diode 30, thereby clamping the line 24 to ground and rendering current supply line 24 at below ground potential. When a row of cores in the memory plane 16 has been selected, as by application of a proper pulse to a terminal 22 of a current driver 20, current will begin to be drawn from the voltage supply +V through the current supply line 24 at a rate increasing in accordance with the level of inductance presented by the line selected, as shown in FIG. 3*a*. Since current source 26 remains constant, the current differential is taken up by a corresponding decrease in current in the diode 30. When the current being drawn by the selected core line reaches a magnitude equal to the full select current $I_s$ generated by current source 26, the diode will be rendered back-biased and non-conductive. At this point the voltage $V_{24}$ along the current supply line 24 will begin to rise in accordance with the inductance of the selected line and circuitry capacitances to a value approaching the voltage $V_s$ less plane and selection switch voltage drops as shown in FIG. 3*b*. The leading edge of this voltage, as shown in FIG. 3*b*, represents the precise moment at which the magnitude of the current flowing through the cores has reached substantially the full select current required to switch the core and begins the output waveform illustrated in FIG. 1. The time $t_A$ in FIGS. 3*a* and 3*b* thus corresponds substantially to the time $t_0$ in FIG. 1. Since the time between $t_0$ and $t_1$ of FIG. 1 can be approximated to a fairly accurate degree, and the time $t_0$ is the initiating cycle point, a strobe circuit can be designed to generate a pulse after the specific delay of $t_A$ to approximately $t_1$.

The stroke pulse generator, shaping and delay circuit 32, which may be of any standard design, is connected to the current supply line 24 and in response to a voltage appearing on the line 24 will generate an output $V_0$, as shown in FIG. 3*c*. The output of the stroke circuit is used to gate the output of the memory plane. Since the stroke pulse delay time need no longer account for the variable inductive coupling of the selected row line nor for the various delays encountered in chains of timing and logic circuitry, nor provide a relatively long delay beginning at $t_0$, but rather beginning at $t_A$, an extremely accurate circuit for providing an accurate stroke pulse for the area bout $t_1$ of FIG. 1 has been described.

Referring now to FIG. 4 there is shown a memory system which makes use of the present invention. An array of magnetic memory cores illustrated generally as 34 is constructed of a number of rows and columns of cores, including a plurality of row conductors 36A–D each coupling all the cores of a row, a plurality of column conductors 38A–D each coupling each of the cores of a column, and an output conductor 40 coupling each core to a sense amplifier 42.

Column selection circuitry 44 is provided in conventional manner for selecting any one of the given columns by means of a half coincidence selection pulse applied to any one of the given columns. Thereafter, the row selection circuitry of FIG. 4 provides the remaining half selection pulse of any one of the given rows, thereby selecting any one of the given cores. It should be understood that row and column designations are applied for ease of explanation, and that the invention can be employed in either row or column selection. It is important however that the invention be used to select the last to be selected coordinate, be it either row or column.

To this end, a plurality of rows selecting transistors 46A–D are coupled through a plurality of row selection diodes 48A–H to each of the various rows of cores and out to a further plurality of rows selecting transistors 50A–D. Each of the row selection transistors are provided with a plurality of input electrodes coupled to each respective transistor base electrode, illustrated generally as terminals *a–h*. Presence of a proper input of any of these base electrode terminals will render the transistor associated therewith conductive. With the arrangement shown, pulses of either polarity may be applied along any one of the given rows, depending upon the nature of the desired operation, i.e. read or write. For example, should it be desired to select the core at the intersection of column line 38C and row line 36B in a first polarity direction, this would be accomplished by the simultaneous selection of transistor 46C, by application of a proper pulse onto the base electrode terminal *c* and transistor 50C by application of a proper pulse onto the base electrode terminal *g*. The current path in this case would be from +V as applied to the emitter electrode of the transistor 46C through the emitter-collector path of transistor 46C, through diode 48D, the selected core, the emitter-collector path of transistor 50C, and up to the common row current drive supply line 52.

After the selection of a row line within the memory plane, the invention now operates in precisely the manner described in connection with FIG. 2. Transistor 54 serves as the constant current source, a temperature compensated reference voltage 56 being applied to the base of the transistor. Temperature compensation voltage source 56, in conjunction with resistance 58, in turn connected to a source of voltage −V, is designed to maintain the full core select current which flows through the emitter-collector path of transistor 54 precisely that which is necessary switch a given core within the memory plane 34, regardless of temperature variations within the plane.

A clamping diode 60 connects the current supply line 52 to ground. The diode acts as a clamp, precisely in the manner described in connection with FIG. 2 and operates to place a voltage initiating pulse on the current supply line 52 when the current through the selected row has risen to the level of the current flowing through the transistor 54. At that moment a strobe pulse generator 62 provides a pulse to a strobe pulse delay circuit 64, the strobe pulse delay circuit being present to provide the required delay necessary to compensate for the core peaking effect as illustrated in FIG. 1. A first AND gate 66, receiving the output pulse from the strobe delay circuit 64, gates the pulse with a strobe gating signal received from another portion of the memory system and which may be used for indicating when strobing is desired or not desired, as for example in accordance with the type of operation occurring in the memory plane. When strobing is desired, the strobe pulse passes through to a second AND gate 68 which strobes the output pulse appearing from the sense amplifier 42.

A typical circuit for strobe generating, shaping and delay and usable with the present invention is shown in FIG. 5, and the voltage waveforms therefor depicted in FIG. 6.

The strobe generating and width control circuit portion of FIG. 5 includes a first transistor $Q_1$, and biasing resistors $R_1$ and $R_3$. A diode $D_1$ couples the voltage appearing at the current source line, for example line 52 in FIG. 4, to the base of transistor $Q_1$. A capacitor $C_1$ connects the base of transistor $Q_1$ to a reference point. The output of transistor $Q_1$ is coupled to the base of transistor $Q_2$ in the strobe delay circuit portion through a diode $D_2$. The base of the transistor $Q_2$ is further coupled to a strobe gating signal through a diode $D_3$, and to the current source line through diode $D_4$. Resistances $R_2$ and $R_4$ supply bias, and a capacitor $C_2$ connects the base of transistor $Q_2$ to a reference point. An $R_1$ $C_1$ time constant delay at transistor $Q_1$ base is allowed to rise when the current source voltage rises as does the $R_2$ $C_2$ time constant of $Q_2$ base. The $Q_2$ circuit provides a leading edge delay of the strobe pulse, while the longer $Q_1$ delay will turn off $Q_2$ transistor, thus controlling strobe pulse width. The strobe logic gating input will inhibit the strobe in modes of memory operation deeming strobing unnecessary. The strobe signal $V_0$ can subsequently be logically AND gated with the sense output signal to determine the selected core's remanent state.

It is to be understood that the foregoing described memory strobe control system can be used with other forms of memory systems and with memory systems of different configurations and arrays. It is further understood that additional embodiments and additional modifications thereof will be obvious to those skilled in the art and are included with the spirit and scope of the present invention.

I claim:

1. In a magnetic memory system, the combination comprising, a coordinately selectable array of magnetic storage elements, means applying a constant current, diode means, said diode means coupled to said means applying a current so as to be rendered conductive thereby and forming an effective current path for said constant current during periods of non-selection of said magnetic storage elements, switching means for selectively connecting a supply line to said effective current path to select at least one of said magnetic storage elements within said array for producing an output from said array in accordance with the remanent condition of said selected storage element, said diode means exhibiting a decreasing current flow therethrough in accordance with the rise in current flow through said supply line after selection of said magnetic storage element, said decrease continuing until said diode is reverse-biased, and fixed-delay pulse generating means responsive to the voltage appearing across said diode as a result of the reverse-biasing of said diode for generating a strobe pulse for accurately strobing the output of said array.

2. In a magnetic memory system, the combination comprising, a coordinately selectable array of magnetic storage elements arranged in rows and columns, one of said columns being pre-selected, a constant current source, a current supply line coupled to said constant current source, diode means, said diode means connected between said current supply line and a source of reference potential, said diode means thereby rendered conductive and forming an effective current path for current from said source during periods of non-selection of a row of said array, a plurality of selectable switching means each coupled by a current supply line to said effective current path for selectively coupling current from said constant current source to any one of the rows of said array to select the one of said magnetic storage elements residing at the intersection of said preselected column and the said one of the rows for providing an output from said array in accordance with the remanent condition of said selected one of said storage elements, said diode means exhibiting a decreasing current flow therethrough in accordance with the rise in current flow through said current supply line in response to selection of said one of said magnetic storage elements, said decrease continuing until said diode is reverse-biased, and fixed delay pulse generating means connected to said current supply line and responsive to the voltage appearing across said diode as a result of the reverse-biasing of said diode for generating a strobe pulse for accurately strobing the output of said array.

3. The combination of claim 2 wherein each of said magnetic storage elements in said array includes a common conductor coupled thereto, a sense amplifier coupled to the output of said common conductor, gating means coupled to the output of said sense amplifier, and means coupling said strobe pulse to the input of said gating means, the output of said gating means representing an accurately strobed area of said array output.

4. The combination of claim 3 wherein said switching means each include a first plurality of individually activatable transistors coupled to one end of each of said rows, a second plurality of individually activatable transistors coupled to the other end of each of said rows, each of said pluralities coupled between a source of potential and said current supply line so as to establish either one of two polarity directions through any one of said rows.

References Cited

UNITED STATES PATENTS

| | | | |
|---|---|---|---|
| 3,162,817 | 12/1964 | MacIntyre | 328—91 |
| 3,435,426 | 3/1969 | Barnes | 340—174 |
| 3,448,388 | 6/1969 | Krause | 328—93 |

BERNARD KONICK, Primary Examiner

K. E. KROSIN, Assistant Examiner

U.S. Cl. X.R.

307—270, 259

PO-1050
(5/69)

UNITED STATES PATENT OFFICE
CERTIFICATE OF CORRECTION

Patent No. 3,501,754 Dated March 17, 1970

Inventor(s) NEIL R. DAVIE

It is certified that error appears in the above-identified patent and that said Letters Patent are hereby corrected as shown below:

Column 2, line 6, cancel "and"; and insert --after--;

Column 2, line 45, cancel "and measure"; and insert --as measured--;

Column 4, line 71 and 73, cancel "stroke" and insert --strobe--;

Column 4, line 75, after "line"; insert --,--;

Column 5, line 4, cancel "stroke"; and insert --strobe--;

Column 5, line 5, cancel "bout"; and insert --about--;

Column 4, line 67, "stroke" should read -- strobe --.

Signed and sealed this 25th day August, 1970.

(SEAL)
Attest:

Edward M. Fletcher, Jr.
Attesting Officer

WILLIAM E. SCHUYLER, JR.
Commissioner of Patents